United States Patent
Ohashi

(10) Patent No.: US 8,408,345 B2
(45) Date of Patent: Apr. 2, 2013

(54) MOVING BODY EQUIPPED WITH FUEL CELL

(75) Inventor: Yasuhiko Ohashi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 83 days.

(21) Appl. No.: 13/144,032

(22) PCT Filed: Feb. 15, 2010

(86) PCT No.: PCT/JP2010/000901
§ 371 (c)(1),
(2), (4) Date: Jul. 11, 2011

(87) PCT Pub. No.: WO2011/099084
PCT Pub. Date: Aug. 18, 2011

(65) Prior Publication Data
US 2012/0103713 A1    May 3, 2012

(51) Int. Cl.
*B60K 11/06* (2006.01)
(52) U.S. Cl. .................. 180/68.4; 903/908
(58) Field of Classification Search ......... 180/65.21, 180/68.4, 68.6; 903/908, 944
See application file for complete search history.

(56) References Cited

U.S. PATENT DOCUMENTS

| | | | |
|---|---|---|---|
| 7,114,586 B2* | 10/2006 | Uozumi | 180/68.1 |
| 7,726,429 B2* | 6/2010 | Suzuki | 180/232 |
| 7,971,670 B2* | 7/2011 | Shiomi et al. | 180/65.31 |

FOREIGN PATENT DOCUMENTS

| | | |
|---|---|---|
| JP | 04-310477 A | 11/1992 |
| JP | 08-192639 A | 7/1996 |
| JP | 2003-267063 A | 9/2003 |
| JP | 2004-063173 A | 2/2004 |
| JP | 2004-175301 A | 6/2004 |
| JP | 2004-217024 A | 8/2004 |
| JP | 2005-150040 A | 6/2005 |
| JP | 2006-218964 A | 8/2006 |
| JP | 2008-100585 A | 5/2008 |
| JP | 2008-218240 A | 9/2008 |

OTHER PUBLICATIONS

International Search Report issued May 25, 2010 in PCT/JP2010/000901.

* cited by examiner

*Primary Examiner* — John Walters
(74) *Attorney, Agent, or Firm* — Kenyon & Kenyon LLP

(57) ABSTRACT

A fuel cell vehicle includes a fuel cell, a radiator, a radiator fan, and a mounting frame. The mounting frame has an opposed member located on an axially extension of a rotating shaft of the radiator fan. When a compression load acting on the rotating shaft reaches a preset load, the rotating shaft of the radiator fan is compressed in an axial center direction along an axial center.

6 Claims, 8 Drawing Sheets

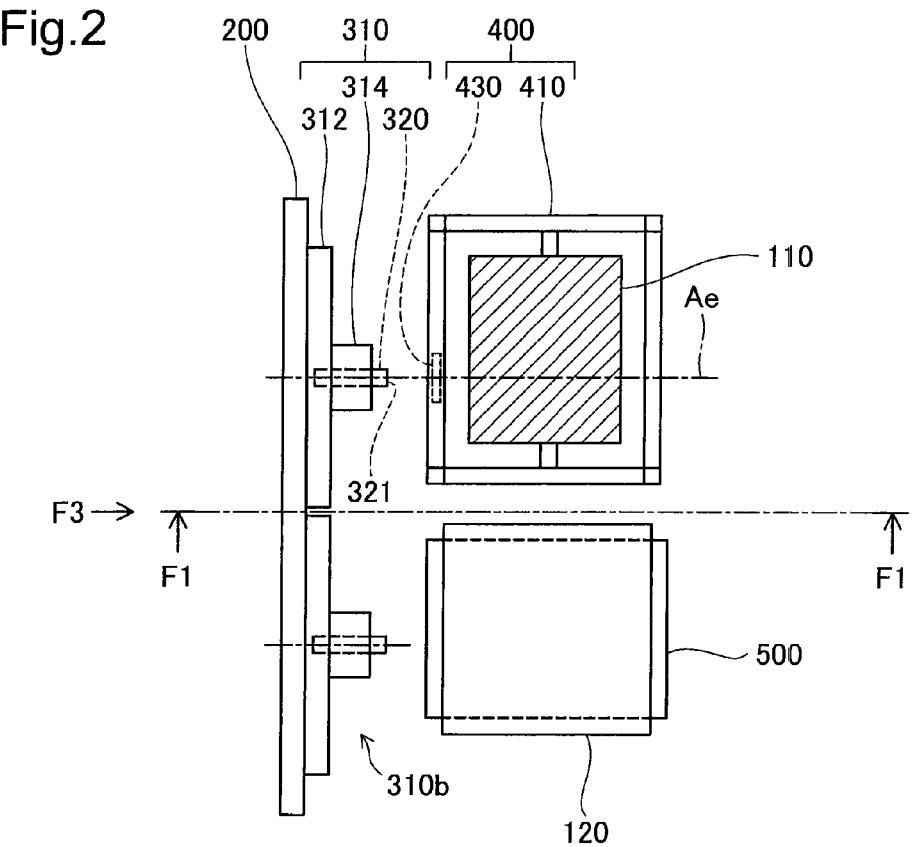
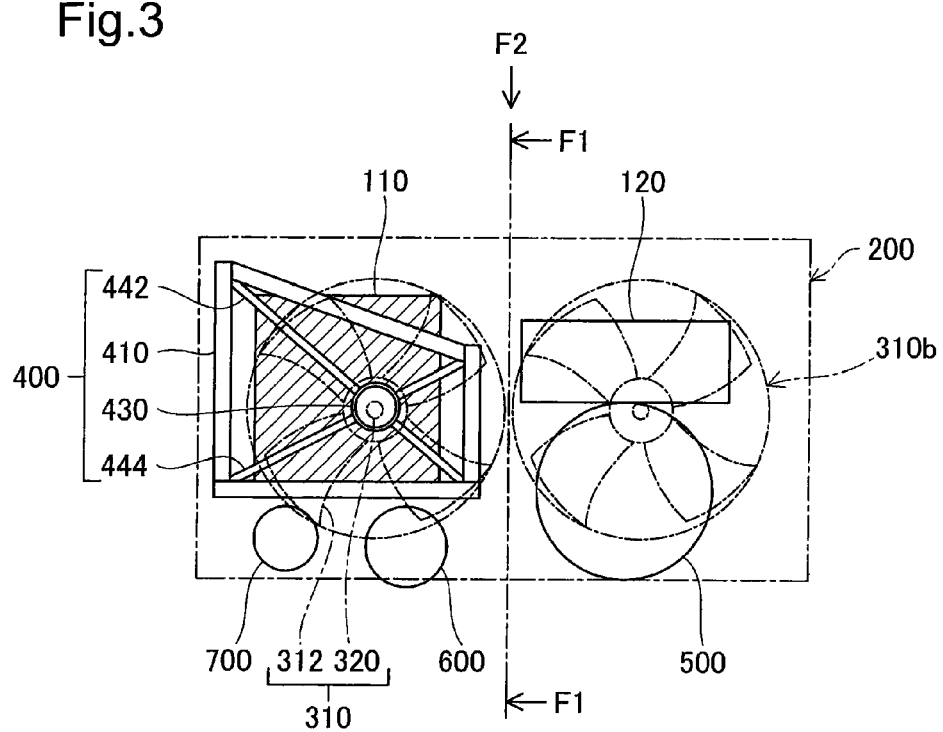

Fig.9
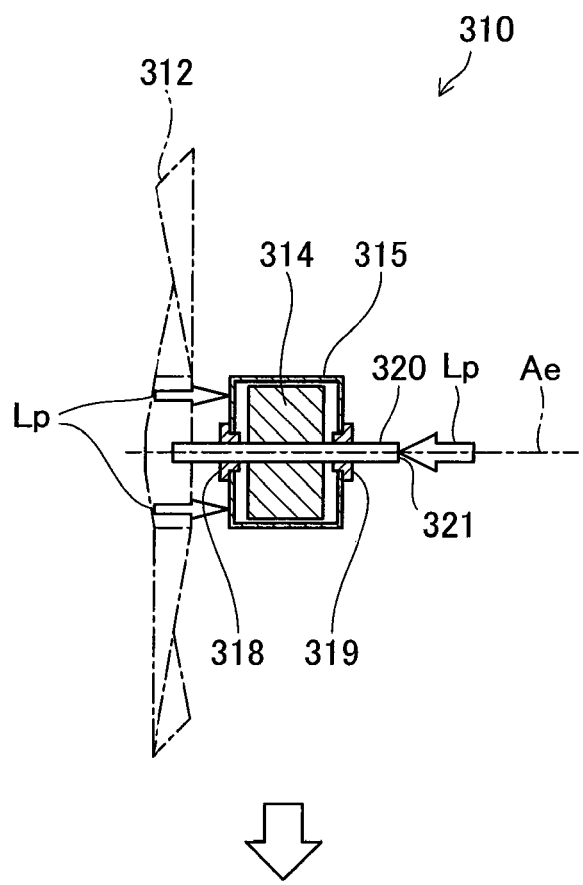
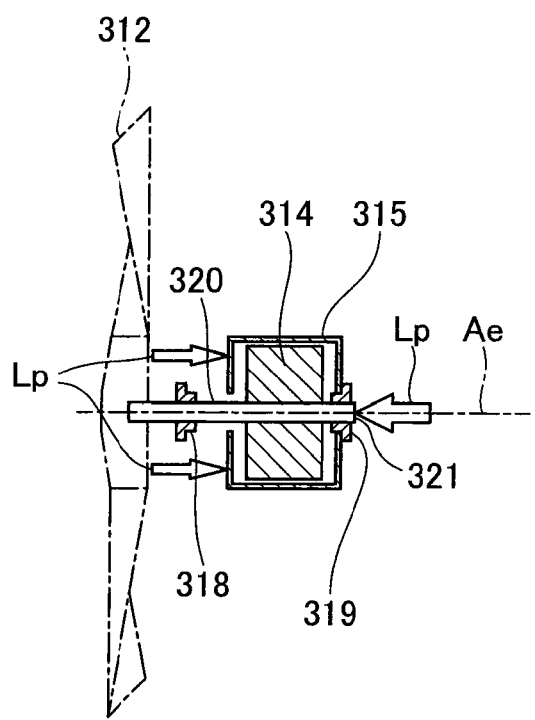

MOVING BODY EQUIPPED WITH FUEL CELL

TECHNICAL FIELD

The present invention relates to a moving body equipped with a fuel cell.

BACKGROUND ART

A known example of the moving body equipped with a fuel cell is a fuel cell vehicle that is an automobile driven by electric power generated by the fuel cell. The fuel cell vehicle further has a power circuit configured to generate an intended power from the electric power generated by the fuel cell (for example, a power control unit or PCU or a DC-DC converter), in addition to the fuel cell. In order to prevent an excess temperature rise of the fuel cell and the power circuit, the fuel cell and the power circuit are generally cooled down by a cooling medium, such as cooling water. The fuel cell vehicle utilizing the cooling medium has a radiator configured to release heat from the cooling medium and a radiator fan configured to blow the air to the radiator. The radiator fan includes fins configured to rotate and thereby produce the airflow and a rotating shaft configured to transmit a rotational force to the fins.

Various structures have been proposed to protect the fuel cell and the power circuit in the event of a collision of the fuel cell vehicle (patent literatures 1 and 2).

CITATION LIST

Patent Literature

PTL 1: JP2004-175301
PTL 2: JP2008-100585

The rotating shaft of the radiator fan is required to have the relatively high rigidity. It is possible that the rotating shaft has a relatively strong impact on other parts located behind the rotating shaft in the event of a collision of the fuel cell vehicle. There have been, however, no sufficient studies or examinations on the potential effects of the rotating shaft of the radiator fan upon the fuel cell and the power circuit in the event of a collision of the fuel cell vehicle.

DISCLOSURE OF THE INVENTION

By taking into account at least part of the issue discussed above, there is a requirement for providing a technique of protecting a fuel cell and a power circuit in the event of a collision of a fuel cell vehicle.

In order to address at least part of the requirement described above, the present invention provides various embodiments and applications described below.

A first aspect of the invention is directed to a moving body including: a fuel cell unit having at least one of a fuel cell configured to generate electric power through electrochemical reaction and a power circuit configured to generate an intended power from the electric power generated by the fuel cell; a radiator configured to release heat from a cooling medium used for cooling down the fuel cell unit; a radiator fan having a fin configured to rotate and thereby produce airflow and a rotating shaft configured to transmit a rotational force to the fin, the radiator fan being provided to blow the air to the radiator; and a mounting structure configured to mount the fuel cell unit on an axially extension of the rotating shaft of the radiator fan. The mounting structure includes an opposed member that has an opposing face to an end of the rotating shaft and is located on the axially extension of the rotating shaft between the fuel cell unit mounted on the mounting structure and the radiator fan. The rotating shaft of the radiator fan is compressed in an axial center direction of the rotating shaft when a compression load acting in the axial center direction reaches a preset load, which is smaller than a specific load of deforming the mounting structure to such a degree that brings the opposed member into contact with the fuel cell unit mounted on the mounting structure.

In the moving body of this aspect, in the event that the radiator fan is moved toward the fuel cell unit by some impact, the rotating shaft of the radiator fan is received by the opposed member of the mounting structure and is then compressed when the compression load acting in the axial center direction reaches the preset load. Such compression effectively relieves or prevents a potential shock that may be transmitted to the fuel cell or the power circuit included in the fuel cell unit mounted on the mounting structure. This structure protects the fuel cell and the power circuit in the case of a collision of the moving body, for example, a fuel cell vehicle.

In one preferable embodiment of the moving body of the above aspect, the rotating shaft of the radiator fan includes a hollow first shaft member and a second shaft member configured to engage coaxially with the first shaft member. The second shaft member of the rotating shaft is inserted into the first shaft member when the compression load reaches the preset load. The moving body of this embodiment readily provides the rotating shaft that is compressed in the axial center direction when the compression load reaches the preset load, while having the rigidity to sufficiently transmit the rotational force to the fin.

In another preferable embodiment of the moving body of the above aspect, the rotating shaft of the radiator fan includes a grooved section having a plurality of grooves formed along the axial center on a surface of the rotating shaft. The grooved section of the rotating shaft splits off along the plurality of grooves and buckles, when the compression load reaches the preset load. The moving body of this embodiment readily provides the rotating shaft that is compressed in the axial center direction when the compression load reaches the preset load, while having the rigidity to sufficiently transmit the rotational force to the fin.

In still another preferable embodiment of the moving body of the above aspect, the opposed member of the mounting structure is recessed in a direction away from the rotating shaft. In the event that the radiator fan is moved toward the fuel cell unit by some impact, the moving body of this embodiment effectively prevents the rotating shaft from being deflected from the opposed member.

In another preferable embodiment of the moving body of the above aspect, the mounting structure includes a reinforcement member that is extended from the opposed member along the axial center in a direction away from the rotating shaft beyond the fuel cell unit mounted on the mounting structure. In the moving body of this embodiment, the other end of the reinforcement member that is different from one end with the opposed member is supported by another structural member. This structure further relieves or prevents a potential shock that may be transmitted to the fuel cell or the power circuit included in the fuel cell unit mounted on the mounting structure.

A second aspect of the invention is directed to a moving body including: a fuel cell unit having at least one of a fuel cell configured to generate electric power through electrochemical reaction and a power circuit configured to generate an intended power from the electric power generated by the fuel cell; a radiator configured to release heat from a cooling medium used for cooling down the fuel cell unit; a radiator fan having a fin configured to rotate and thereby produce airflow and a rotating shaft configured to transmit a rotational force to the fin, the radiator fan being provided to blow the air to the radiator; and a mounting structure configured to mount the fuel cell unit on an axially extension of the rotating shaft of the radiator fan. The mounting structure includes an opposed member that has an opposing face to an end of the rotating shaft and is located on the axially extension of the rotating shaft between the fuel cell unit mounted on the mounting structure and the radiator fan. The rotating shaft of the radiator fan is released in a direction away from the fuel cell unit by a preset load, which is smaller than a specific load of deforming the mounting structure to such a degree that brings the opposed member into contact with the fuel cell unit mounted on the mounting structure. In the moving body of this aspect, in the event that the radiator fan is moved toward the fuel cell unit by some impact, the rotating shaft of the radiator fan is received by the opposed member of the mounting structure and is then released in the direction away from the fuel cell unit. The overall radiator fan is accordingly released from the fuel cell unit. Such release effectively relieves or prevents a potential shock that may be transmitted to the fuel cell or the power circuit included in the fuel cell unit mounted on the mounting structure. This structure protects the fuel cell and the power circuit in the case of a collision of the moving body, for example, a fuel cell vehicle.

The technique of the present invention is not restricted to the moving body having any of the configurations and arrangements discussed above but may be actualized by diversity of other applications, for example, a fuel cell vehicle equipped with a fuel cell and a mounting structure configured to mount a fuel cell. The invention is not restricted to any of the configurations and arrangements discussed above but may be actualized by any of various embodiments without departing from the scope of the invention.

BRIEF DESCRIPTION OF THE DRAWINGS

FIG. 2 is an explanatory diagram of various components located in an engine room of the fuel cell vehicle;

FIG. 3 is an explanatory diagram of various components located in the engine room of the fuel cell vehicle;

FIG. 9 is an explanatory diagram of the detailed structure of the radiator fan in a third embodiment;

DESCRIPTION OF EMBODIMENTS

In order to further clarify the aspects and the effects of the invention discussed above, some embodiments of the moving body according to the invention are discussed below.

A. First Embodiment

Figure 1:
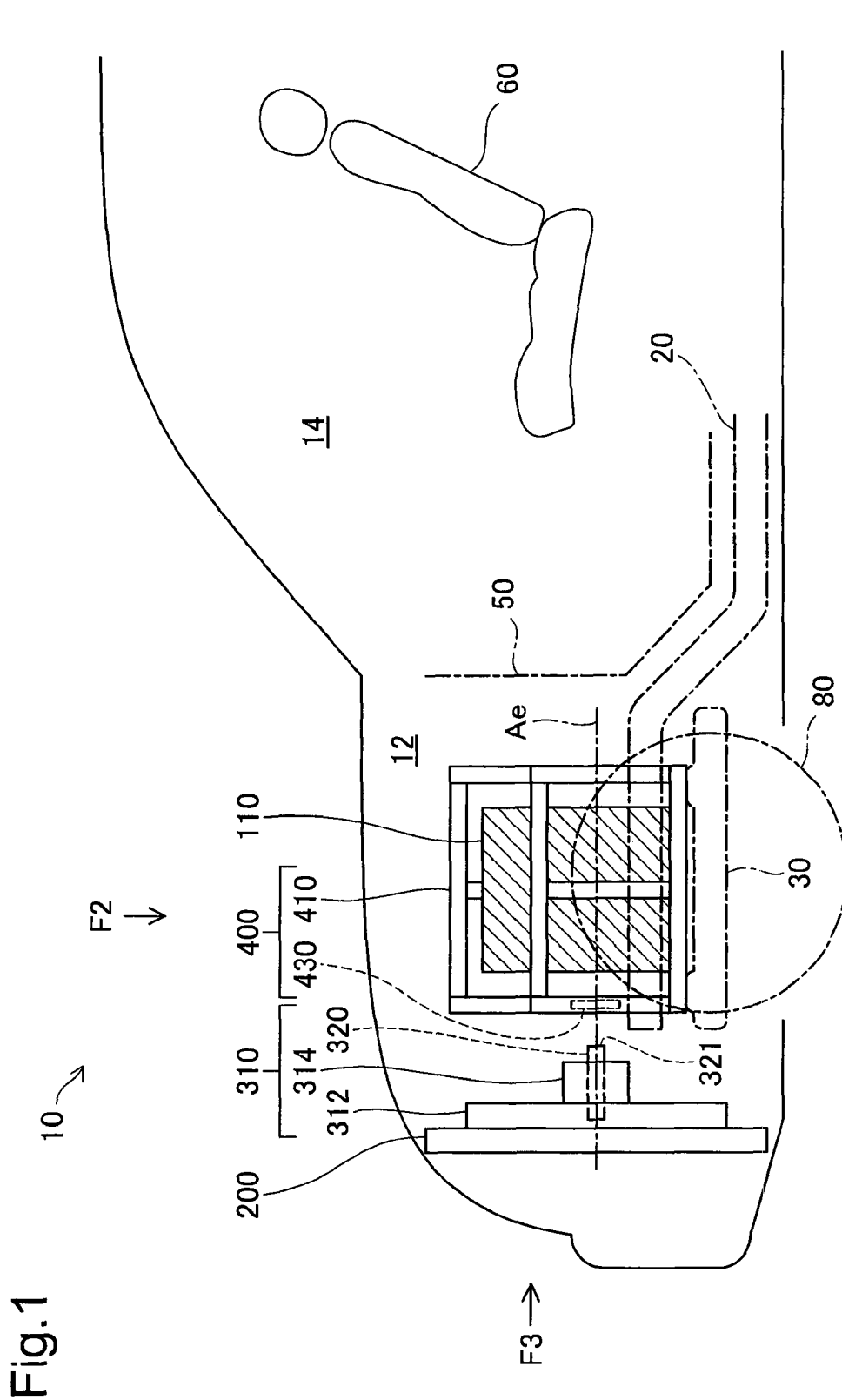
FIG. 1 is an explanatory diagram of the configuration of a fuel cell vehicle.

FIG. 1 is an explanatory diagram of the configuration of a fuel cell vehicle 10. The fuel cell vehicle 10 is an automobile driven by electric power generated by a fuel cell 110 as one example of a moving body equipped with the fuel cell 110. FIG. 1 shows a side view of a front part of the fuel cell vehicle 10, where the "front" means a fore end in the direction of forward motion.

The fuel cell vehicle 10 has side members 20, a suspension member 30, and a dashboard panel 50 as structural members for ensuring the rigidity of the vehicle body. The side members 20 of the fuel cell vehicle 10 are reinforcing members located to be extended along the longitudinal direction of the fuel cell vehicle 10. The suspension member 30 of the fuel cell vehicle 10 is attached to the side members 20 to reinforce suspensions (not shown) for suspending respective wheels 80. The dashboard panel 50 of the fuel cell vehicle 10 is a plate member parting an engine room 12 from a passenger compartment 14. The engine room 12 of the fuel cell vehicle 10 has space for various components including the fuel cell 110, whereas the passenger compartment 14 of the fuel cell vehicle 10 has seats 60 to accommodate a driver and passengers.

FIGS. 2 and 3 are explanatory diagrams of the various components located in the engine room 12 of the fuel cell vehicle 10. FIG. 2 is a top view of the engine room 12 seen from the top side of the fuel cell vehicle 10 (i.e., in the direction of an arrow F2 shown FIGS. 1 and 3). FIG. 3 is a front view of the engine room 12 seen from the front side of the fuel cell vehicle 10 (i.e., in the direction of an arrow F3 shown in FIGS. 1 and 2). The side view of FIG. 1 is taken on a line of the arrow F1 shown in FIGS. 2 and 3. For the easier understanding, the fuel cell 110 is hatched in FIGS. 1 through 3. Referring to FIGS. 1 through 3, the fuel cell vehicle 10 has a power circuit 120, a radiator 200, and a radiator fan 310, in addition to the fuel cell 110, as the various components located in the engine room 12.

The fuel cell 110 of the fuel cell vehicle 10 is a fuel cell unit provided by assembling and unitizing a plurality of power generation cells or unit elements for generating electric power through electrochemical reaction. In this embodiment, the fuel cell 110 is a polymer electrolyte fuel cell and generates electric power through electrochemical reaction of a hydrogen-containing fuel gas with an oxygen-containing oxidizing gas. The fuel gas supplied to the fuel cell 110 is hydrogen gas stored in a hydrogen reservoir or a hydrogen absorbing alloy in this embodiment, but may alternatively be hydrogen gas produced by reforming a hydrocarbon fuel. The oxidizing gas supplied to the fuel cell 110 is the air from the atmosphere in this embodiment.

The power circuit 120 of the fuel cell vehicle 10 is another fuel cell unit provided by unitizing electric circuits for generating an intended power from the electric power generated by the fuel cell 110. In this embodiment, the power circuit 120 is provided as the fuel cell unit including a power control unit (PCU) for controlling the output of electric power from the fuel cell 110. In other applications, the power circuit 120 may be provided as a fuel cell unit including a DC-DC converter for converting DC voltages output from the fuel cell 110 or may be provided as a fuel cell unit including both the power control unit (PCU) and the DC-DC converter. Referring to FIGS. 2 and 3, the power circuit 120 is mounted on a drive motor 500 used to generate the driving power for driving the wheels 80. In this embodiment, the fuel cell 110 is located on a right side of the fuel cell vehicle 10 in the direction of forward motion, whereas the power circuit 120 and the drive motor 500 are located on a left side of the fuel cell vehicle 10 in the direction of forward motion, as shown in FIGS. 2 and 3. In other applications, this left-to-right positional relation may be inverted.

The radiator 200 of the fuel cell vehicle 10 releases heat from cooling water, which is employed as a cooling medium for cooling down the fuel cell 110, to the atmosphere. The radiator 200 performs heat exchange of the cooling water used for cooling down the fuel cell 110 in this embodiment, but may alternatively perform heat exchange of cooling water used for cooling down the power circuit 120. In this embodiment, the cooling water is employed as the cooling medium for cooling down the fuel cell 110. In other applications, cooling oil or cooling gas may be employed for the same purpose.

The radiator fan 310 of the fuel cell vehicle 10 blows the air to enhance the radiation efficiency of the radiator 200 for heat release from the cooling water. The radiator fan 310 includes fins 312, a motor 314, and a rotating shaft 320. The motor 314 of the radiator fan 310 generates torque. The rotating shaft 320 of the radiator fan 310 transmits the torque generated by the motor 314 to the fins 312. The fins 312 of the radiator fan 310 are blades utilizing the torque transmitted by the rotating shaft 320 to rotate and thereby produce the airflow. The detailed structure of the radiator fan 310 will be described later.

In this embodiment, the radiator 200 is sufficiently larger in size than the radiator fan 310. The fuel cell vehicle 10 accordingly has an additional radiator fan 310b, along with the radiator fan 310. The radiator fan 310b has the same structure as that of the radiator fan 310. In this embodiment, the radiator fan 310 is located on the right side of the fuel cell vehicle 10 in the direction of forward motion, whereas the radiator fan 310b is located on the left side of the fuel cell vehicle 10 in the direction of forward motion, as shown in FIGS. 2 and 3.

The fuel cell vehicle 10 has a mounting frame 400 provided as a structure for mounting the fuel cell 110. As shown in FIGS. 1 through 3, the mounting frame 400 mounts the fuel cell 110 on an axially extension of the rotating shaft 320 of the radiator fan 310, i.e., on an axial center Ae of the rotating shaft 320.

In this embodiment, the mounting frame 400 is attached to the side member 20 via the suspension member 30 as shown in FIG. 1. In other applications, the mounting frame 400 may be attached directly to the side member 20 or may be attached to another structural member of the fuel cell vehicle 10. In this embodiment, an air compressor 600 and a cooling water pump 700 are provided below the mounting frame 400 to supply the oxidizing gas to the fuel cell 110 and to circulate the cooling water after the heat removal by the radiator 200 to the fuel cell 100, respectively.

Figure 4:
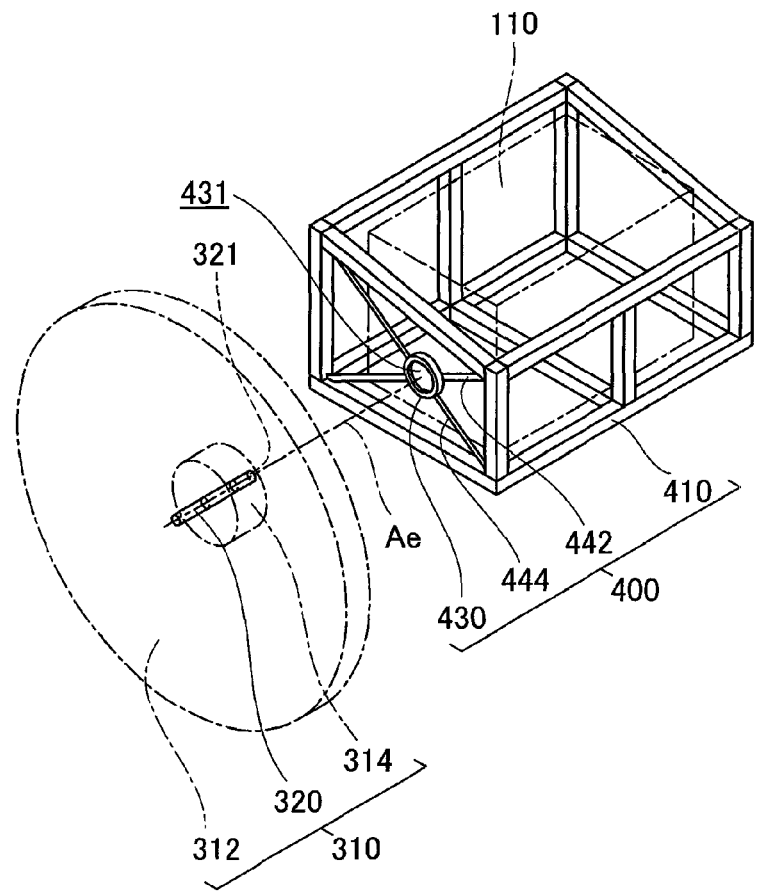
FIG. 4 is a perspective view of a mounting frame.

FIG. 4 is a perspective view of the mounting frame 400. The illustration of the mounting frame 400 with the fuel cell 110 mounted thereon, along with the rotating shaft 320 of the radiator fan 310 in FIG. 4 reveals the positional relation of the respective components, i.e., the fuel cell 110, the rotating shaft 320, and the mounting frame 400. The mounting frame 400 includes a frame body 410, an opposed member 430, and auxiliary members 442 and 444. The frame body 410 of the mounting frame 400 is a framework surrounding the fuel cell 110 and is specifically a hexahedral framework in this embodiment. The fuel cell 110 is located inside the frame body 410. The opposed member 430 of the mounting frame 400 is provided on an axially extension of the rotating shaft 320 between the fuel cell 110 mounted on the mounting frame 400 and the radiator fan 310 located in the vicinity of the mounting frame 400. The opposed member 430 has an opposing face 431 to an end 321 of the rotating shaft 320. In this embodiment, the auxiliary members 442 and 444 of the mounting frame 400 are bracing members provided on the frame body 410 to intersect each other. The opposed member 430 is provided at the intersection of the auxiliary members 442 and 444.

Figure 5:
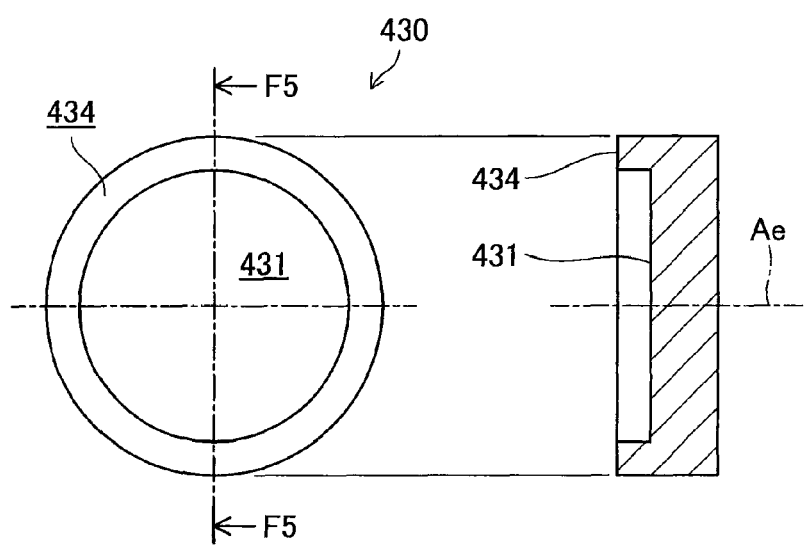
FIG. 5 is an explanatory diagram of the detailed structure of an opposed member of the mounting frame.

FIG. 5 is an explanatory diagram of the detailed structure of the opposed member 430 of the mounting frame 400. The left-side drawing of FIG. 5 is a front view of the opposed member 430 seen from the side of the rotating shaft 320, and the right-side drawing of FIG. 5 is a sectional view of the opposed member 430 taken on a line of an arrow F5 in the front view. The opposed member 430 is a disc-shaped member in this embodiment as shown in FIG. 5, but may be a polygonal plate member or a columnar member as part of the frame body 410. The opposed member 430 is recessed in a direction away from the rotating shaft 320. In this embodiment, the opposing face 431 of the opposed member 430 is formed as a step recessed from an outer periphery 434.

Figure 6:
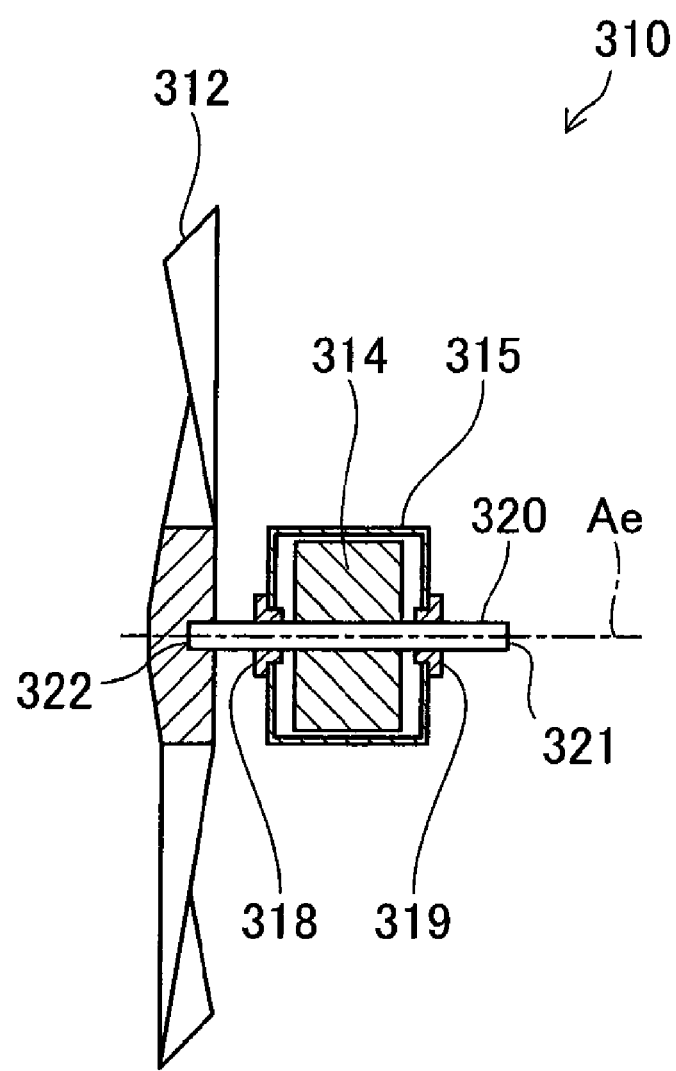
FIG. 6 is an explanatory diagram of the detailed structure of a radiator fan.

FIG. 6 is an explanatory diagram of the detailed structure of the radiator fan 310. The sectional view of FIG. 6 schematically shows the radiator fan 310 taken along the axial center Ae of the rotating shaft 320. The motor 314 of the radiator fan 310 is coupled with the rotating shaft 320 and is located in a fan casing 315. The rotating shaft 320 coupled with the motor 314 is held on the fan casing 315 in a rotatable manner via bearings 318 and 319. Both ends 321 and 322 of the rotating shaft 320 are protruded outside the fan casing 315. One end 321 faces the opposed member 430 of the mounting frame 400, whereas the other end 322 is connected with the fins 312.

The rotating shaft 320 of the radiator fan 310 has sufficient rigidity to ensure the durability for continuously supporting the fins 312 while transmitting the rotational force to the fins 312. The rotating shaft 320 is a metal shaft in this embodiment but may be a ceramic shaft or a resin shaft in other applications. In this embodiment, the rotating shaft 320 is structured to be quickly compressed in the axial center direction when a compression load Lc acting in the axial center direction along the axial center Ae reaches a preset load Ls. The preset load Ls causes quick compression of the rotating shaft 320 and is smaller than a specific load of deforming the mounting frame 400 to such a degree that brings the opposed member 430 into contact with the fuel cell 110 mounted on the mounting frame 400.

Figure 7:
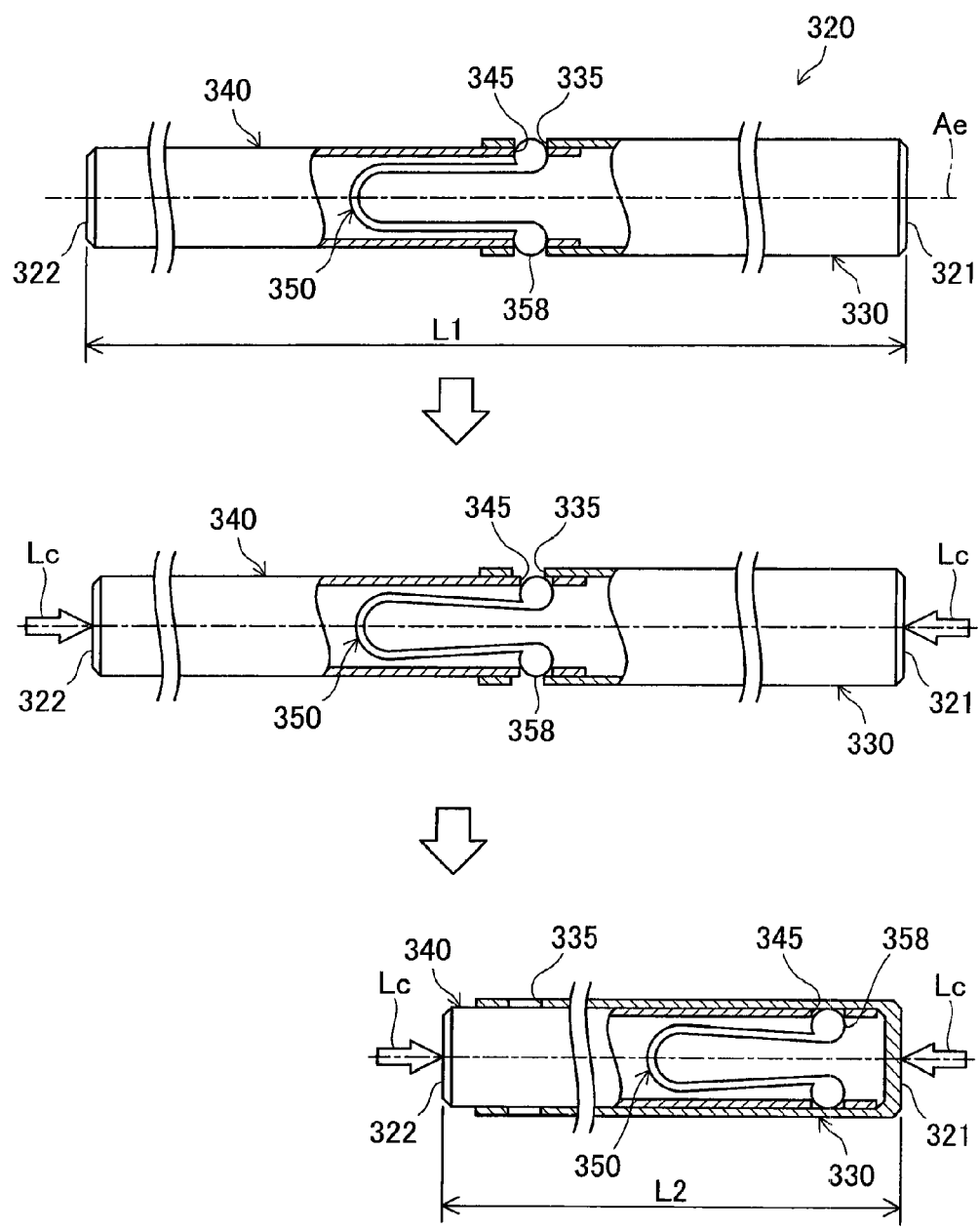
FIG. 7 is an explanatory diagram of the detailed structure of a rotating shaft of the radiator fan.

FIG. 7 is an explanatory diagram of the detailed structure of the rotating shaft 320 of the radiator fan 310. The top drawing of FIG. 7 shows the rotating shaft 320 prior to the compression. The middle drawing of FIG. 7 shows the rotating shaft 320 in the state that the compression load Lc reaches the preset load Ls. The bottom drawing of FIG. 7 shows the rotating shaft 320 after the compression.

The rotating shaft 320 of the radiator fan 310 includes a first shaft member 330, a second shaft member 340, and a locking member 350. The first shaft member 330 of the rotating shaft 320 is a cylindrical member having one end closed and the other end open to receive the second shaft member 340 therein. The closed end of the first shaft member 330 serves as one end 321 of the rotating shaft 320. An engagement hole 335 is formed in the side face of the first shaft member 330 at a position near to the open end of the first shaft member 330 to enable engagement with the locking member 350. The second shaft member 340 of the rotating shaft 320 is a cylindrical member having one end closed and the other end open and a smaller inner diameter than the inner diameter of the first shaft member 330 to allow for insertion into the first shaft member 330. The closed end of the second shaft member 340 serves as the other end 322 of the rotating shaft 320. An engagement hole 345 is formed in the side face of the second shaft member 340 at a position near to the open end of the second shaft member 340 to enable engagement with the locking member 350. The locking member 350 of the rotating shaft 320 has an engagement projection 358 to be fit in both the engagement hole 335 of the first shaft member 330 and the engagement hole 345 of the second shaft member 340. The engagement projection 358 is pressed outward in a radial direction of the rotating shaft 320.

Referring to the top drawing of FIG. 7 showing the rotating shaft 320 prior to the compression, the engagement projection 358 of the locking member 350 is fit in the overlapped engagement holes 335 and 345 of the first shaft member 330 and the second shaft member 340. This causes the first shaft member 330 to coaxially engage with the second shaft member 340. The rotating shaft 320 accordingly has the sufficient rigidity to ensure the durability for continuously supporting the fins 312 while transmitting the rotational force to the fins 312.

Referring to the middle drawing of FIG. 7 where the compression load Lc acting on the axial center Ae of the rotating shaft 320 reaches the preset load Ls, the engagement projection 358 of the locking member 350 is pressed inward in the radial direction of the rotating shaft 320, so that the engagement projection 358 of the locking member 350 is released from the engagement hole 335 of the first shaft member 330. The second shaft member 340 is then quickly inserted into the first shaft member 330 as shown in the bottom drawing of FIG. 7. The overall axial length of the rotating shaft 320 rapidly reduces from a length L1 to a length L2 according to the inserted length of the second shaft member 340 into the first shaft member 330.

In the fuel cell vehicle 10 of the first embodiment described above, in the event that the radiator fan 310 is moved toward the fuel cell 110 by some impact, the rotating shaft 320 of the radiator fan 310 is received by the opposed member 430 of the mounting frame 400 and is then rapidly compressed when the compression load Lc acting in the axial center direction along the axial center Ae reaches the preset load Ls. Such compression effectively relieves or prevents a potential shock that may be transmitted to the fuel cell 110 mounted on the mounting frame 400. This structure protects the fuel cell 110 in the case of a collision of the fuel cell vehicle 10.

The rotating shaft 320 of the radiator fan 310 includes the first shaft member 330 and the second shaft member 340. This structure readily provides the rotating shaft 320 that is quickly compressed in the axial center direction along the axial center Ae when the compression load Lc reaches the preset load Ls, while having the rigidity to sufficiently transmit the rotational force to the fins 312.

The opposed member 430 of the mounting frame 400 is recessed in the direction away from the rotating shaft 320 of the radiator fan 310. In the event that the radiator fan 310 is moved toward the fuel cell 110 by some impact, this structure prevents the rotating shaft 320 from being deflected from the opposed member 430.

B. Second Embodiment

A fuel cell vehicle 10 of a second embodiment is similar to the fuel cell vehicle 10 of the first embodiment, except the structure of the rotating shaft 320 of the radiator fan 310.

Figure 8:
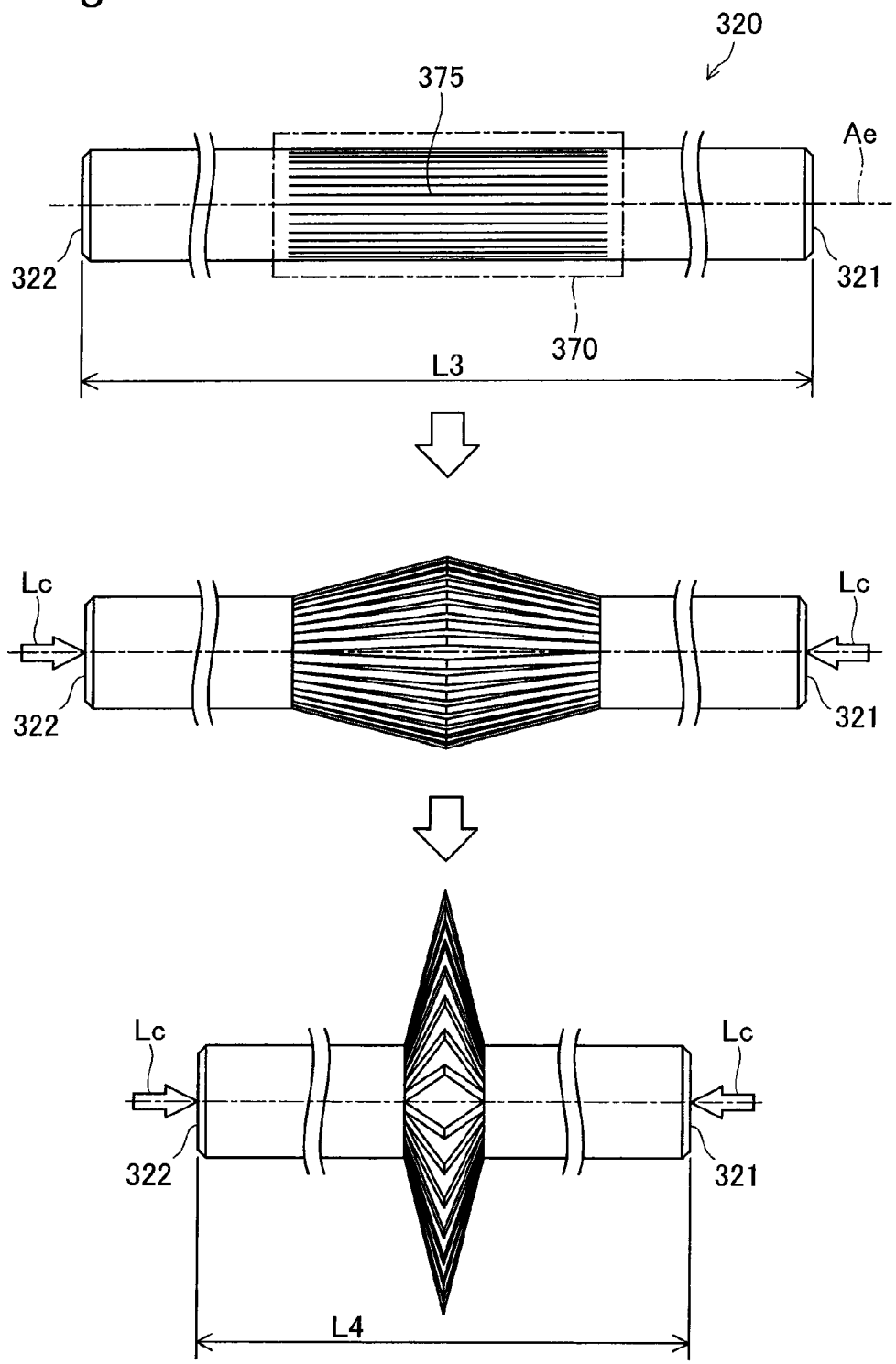
FIG. 8 is an explanatory diagram of the detailed structure of the rotating shaft of the radiator fan in a second embodiment.

FIG. 8 is an explanatory diagram of the detailed structure of the rotating shaft 320 of the radiator fan 310 in the second embodiment. The top drawing of FIG. 8 shows the rotating shaft 320 prior to the compression. The middle drawing of FIG. 8 shows the rotating shaft 320 in the state that the compression load Lc reaches the preset load Ls. The bottom drawing of FIG. 8 shows the rotating shaft 320 after the compression.

In the second embodiment, the rotating shaft 320 of the radiator fan 310 is a hollow cylindrical member including a grooved section 370 having a plurality of grooves 375 formed on the surface along the axial center Ae. Referring to the top drawing of FIG. 8 showing the rotating shaft 320 prior to the compression, the grooved section 370 maintains the cylindrical shape. The rotating shaft 320 accordingly has the sufficient rigidity to ensure the durability for continuously supporting the fins 312 while transmitting the rotational force to the fins 312.

Referring to the middle drawing of FIG. 8 where the compression load Lc acting on the axial center Ae of the rotating shaft 320 reaches the preset load Ls, the grooved section 370 of the rotating shaft 320 splits off along the plurality of grooves 375. The grooved section 370 then rapidly buckles as shown in the bottom drawing of FIG. 8. The overall axial length of the rotating shaft 320 rapidly reduces from a length L3 to a length L4 according to the reduced length of the grooved section 370 by buckling.

Like the first embodiment, the fuel cell vehicle 10 of the second embodiment described above effectively relieves or prevents a potential shock that may be transmitted to the fuel cell 110 mounted on the mounting frame 400. The grooved section 370 formed in the rotating shaft 320 of the radiator fan 310 readily provides the rotating shaft 320 that is quickly compressed in the axial center direction along the axial center Ae when the compression load Lc reaches the preset load Ls, while having the rigidity to sufficiently transmit the rotational force to the fins 312.

C. Third Embodiment

A fuel cell vehicle 10 of a third embodiment is similar to the fuel cell vehicle 10 of the first embodiment, except the structure of the radiator fan 310. The radiator fan 310 of the third embodiment is similar to the radiator fan 310 of the first embodiment, except the structure of releasing the rotating shaft 320 in a direction away from the fuel cell 110 by a preset load Ls, which is smaller than a specific load of deforming the mounting frame 400 to such a degree that brings the opposed member 430 into contact with the fuel cell 110 mounted on the mounting frame 400.

FIG. 9 is an explanatory diagram of the detailed structure of the radiator fan 310 in the third embodiment. The top drawing of FIG. 9 is a sectional view of the radiator fan 310 prior to the release of the rotating shaft 320, taken along the axial center Ae of the rotating shaft 320. The bottom drawing of FIG. 9 is a sectional view of the radiator fan 310 after the release of the rotating shaft 320. In the radiator fan 310 of the third embodiment, when a pressing load Lp acting to press the rotating shaft 320 along the axial center Ae toward the fins 312 relative to the fan casing 315 reaches the preset load Ls, the rotating shaft 320 slides along the axial center Ae in the bearing 319 toward the fins 312 and is released together with the bearing 319 from the fan casing 315, as shown in the bottom drawing of FIG. 9. In the state that the radiator fan 310 is mounted on the fuel cell vehicle 10, the rotating shaft 320 is released along the axial center Ae in the direction away from the fuel cell 110 when the pressing load Lp reaches the preset load Ls.

In the fuel cell vehicle 10 of the third embodiment described above, in the event that the radiator fan 310 is moved toward the fuel cell 110 by some impact, the rotating shaft 320 of the radiator fan 310 is received by the opposed member 430 of the mounting frame 400 and is then rapidly released in the direction away from the fuel cell 110. The overall radiator fan 310 including the motor 314 is thus released from the fuel cell 110. Such release effectively relieves or prevents a potential shock that may be transmitted to the fuel cell 110 mounted on the mounting frame 400. This structure protects the fuel cell 110 in the case of a collision of the fuel cell vehicle 10.

D. Fourth Embodiment

A fuel cell vehicle 10 of a fourth embodiment is similar to the fuel cell vehicle 10 of the first embodiment, except the structure of the mounting frame 400.

Figure 10:
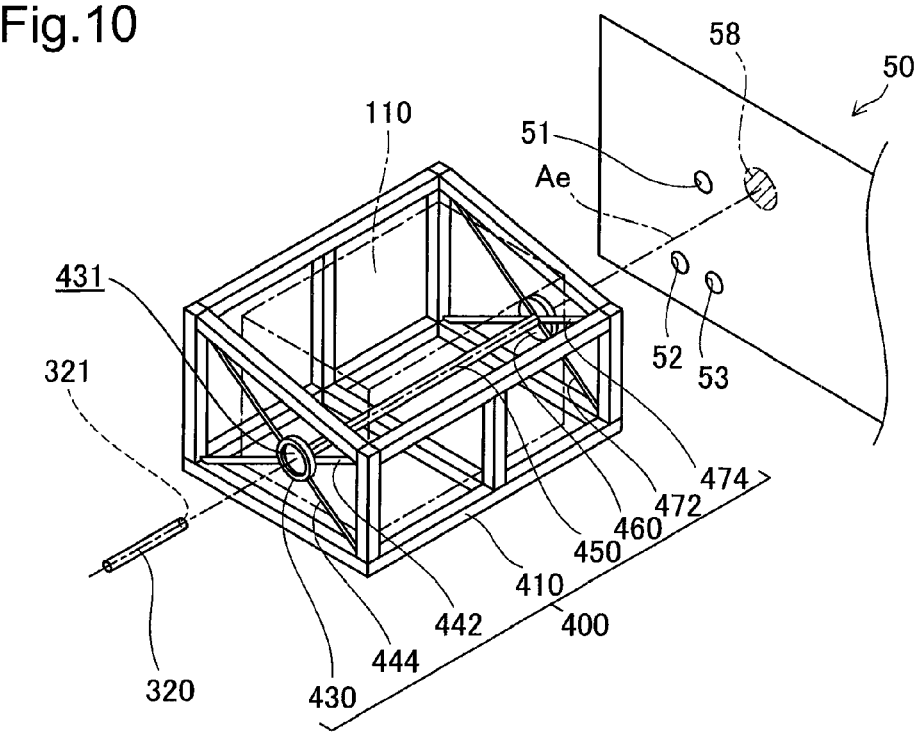
FIG. 10 is a perspective view of the mounting frame in a fourth embodiment.

FIG. 10 is a perspective view of the mounting frame 400 in the fourth embodiment. The illustration of the mounting frame 400 with the fuel cell 110 mounted thereon, along with the rotating shaft 320 of the radiator fan 310 and the dashboard panel 50 in FIG. 10 reveals the positional relation of the respective components, i.e., the dashboard panel 50, the fuel cell 110, the rotating shaft 320, and the mounting frame 400. The mounting frame 400 of the fourth embodiment further includes a reinforcement member 450, a dashboard panel opposed member 460, and auxiliary members 472 and 474, in addition to the components of the mounting frame 400 of the first embodiment. The reinforcement member 450 of the mounting frame 400 is extended from the opposed member 430 along the axial center Ae of the rotating shaft 320 in the direction away from the rotating shaft 320 beyond the fuel cell 110 mounted on the mounting frame 400. In this embodiment, part of the fuel cell 110 is fastened to the reinforcement member 450. The dashboard panel opposed member 460 of the mounting frame 400 is located at the other end of the two ends of the reinforcement member 450, which is different from one end with the opposed member 430 located thereon, and has a face opposed to the dashboard panel 50. In this embodiment, the auxiliary members 472 and 474 of the mounting frame 400 are bracing members provided on the frame body 410 to intersect each other. The dashboard panel opposed member 460 is provided at the intersection of the auxiliary members 472 and 474.

Referring to FIG. 10, a projection area 58 specified by projecting the dashboard panel opposed member 460 of the mounting frame 400 onto the dashboard panel 50 along the axial center Ae of the rotating shaft 320 is apart from mounting locations for mounting the operation control-relevant parts of the fuel cell vehicle 10, i.e., a steering part attachment position 51, an accelerator part attachment position 52, and a brake part attachment position 53 provided on the dashboard panel 50. A steering for controlling the moving direction of the fuel cell vehicle 10 is installed at the steering part attachment position 51 on the dashboard panel 50. An accelerator for controlling the acceleration of the fuel cell vehicle 10 is installed at the accelerator part attachment position 52 on the dashboard panel 50. A decelerator for controlling the speed reduction of the fuel cell vehicle 10 is installed at the brake part attachment position 53 on the dashboard panel 50. In this embodiment, the projection area 58 of the dashboard panel 50 is reinforced to have the higher rigidity than the rigidity of the remaining area of the dashboard panel 50.

Like the first embodiment, the fuel cell vehicle 10 of the fourth embodiment described above effectively relieves or prevents a potential shock that may be transmitted to the fuel cell 110 mounted on the mounting frame 400. The other end of the reinforcement member 450 that is different from one end with the opposed member 430 is supported by the dashboard panel 50 via the dashboard panel opposed member 460. This structure further relieves or prevents the potential shock that may be transmitted to the fuel cell 110 mounted on the mounting frame 400. The projection area 58 specified by projecting the dashboard panel opposed member 460 onto the dashboard panel 50 is apart from the steering part attachment position 51, the accelerator part attachment position 52, and the brake part attachment position 53 on the dashboard panel 50. This structure protects the operation control-relevant parts of the fuel cell vehicle 10, while protecting the fuel cell 110. The projection area 58 specified by projecting the dashboard panel opposed member 460 onto the dashboard panel 50 is reinforced to have the higher rigidity than the rigidity of the remaining area of the dashboard panel 50. This structure protects the passenger compartment 14, while protecting the fuel cell 110.

E. Fifth Embodiment

A fuel cell vehicle 10 of a fifth embodiment is similar to the fuel cell vehicle 10 of the first embodiment, except the structure of the opposed member 430 of the mounting frame 400.

Figure 11:
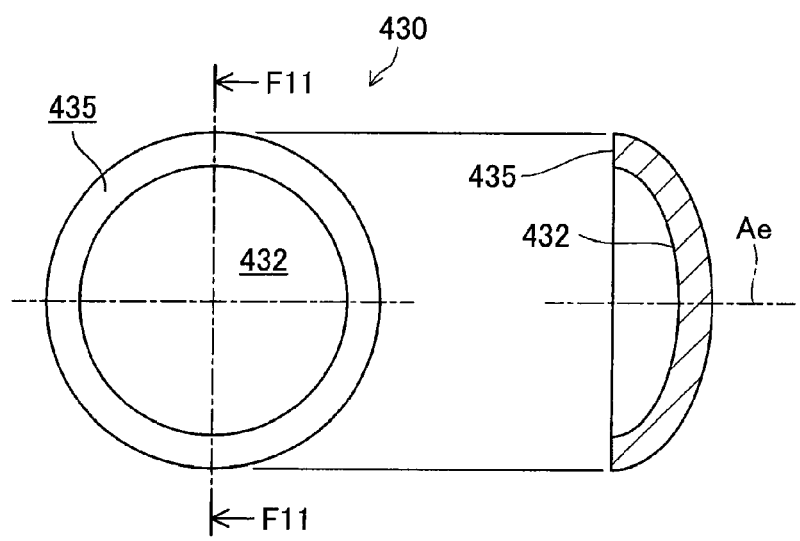
FIG. 11 is an explanatory diagram of the detailed structure of the opposed member of the mounting frame in a fifth embodiment.

FIG. 11 is an explanatory diagram of the detailed structure of the opposed member 430 of the mounting frame 400 in the fifth embodiment. The left-side drawing of FIG. 11 is a front view of the opposed member 430 seen from the side of the rotating shaft 320, and the right-side drawing of FIG. 11 is a sectional view of the opposed member 430 taken on a line of an arrow F11 in the front view. As shown in FIG. 11, the opposed member 430 of the fifth embodiment is a hemispherical member. The opposed member 430 is recessed in a direction away from the rotating shaft 320. In this embodiment, an opposing face 432 of the opposed member 430 is formed as a hemisphere recessed from an outer periphery 435.

Like the first embodiment, in the fuel cell vehicle 10 of the fifth embodiment described above, the opposed member 430 of the mounting frame 400 is recessed in the direction away from the rotating shaft 320 of the radiator fan 310. In the event that the radiator fan 310 is moved toward the fuel cell 110 by some impact, this structure prevents the rotating shaft 320 from being deflected from the opposed member 430.

F. Other Aspects

The embodiment discussed above is to be considered in all aspects as illustrative and not restrictive. There may be many modifications, changes, and alterations without departing from the scope or spirit of the main characteristics of the present invention. For example, the first through the fifth embodiments describe the mounting frame 400 for mounting the fuel cell 110 thereon. The principle of the present invention is similarly applicable to a mounting frame for mounting the power circuit 120 in place of the fuel cell 110 or to a mounting frame for mounting the power circuit 120 in addition to the fuel cell 110. Two or more structures among those of the first through the fifth embodiments may be combined according to the requirements.

The invention claimed is:

1. A moving body, comprising:
   a fuel cell unit having at least one of a fuel cell configured to generate electric power through electrochemical reaction and a power circuit configured to generate an intended power from the electric power generated by the fuel cell;
   a radiator configured to release heat from a cooling medium used for cooling down the fuel cell unit;
   a radiator fan having a fin configured to rotate and thereby produce airflow and a rotating shaft configured to transmit a rotational force to the fin, the radiator fan being provided to blow the air to the radiator; and
   a mounting structure configured to mount the fuel cell unit on an axially extension of the rotating shaft of the radiator fan,
   wherein the mounting structure includes an opposed member that has an opposing face to an end of the rotating shaft and is located on the axially extension of the rotating shaft between the fuel cell unit mounted on the mounting structure and the radiator fan, and
   the rotating shaft of the radiator fan is compressed in an axial center direction of the rotating shaft when a compression load acting in the axial center direction reaches a preset load, which is smaller than a specific load of deforming the mounting structure to such a degree that brings the opposed member into contact with the fuel cell unit mounted on the mounting structure.

2. The moving body in accordance with claim 1, wherein the rotating shaft of the radiator fan includes a hollow first shaft member and a second shaft member configured to engage coaxially with the first shaft member, and
   the second shaft member of the rotating shaft is inserted into the first shaft member when the compression load reaches the preset load.

3. The moving body in accordance with claim 1, wherein the rotating shaft of the radiator fan includes a grooved section having a plurality of grooves formed along the axial center on a surface of the rotating shaft, and
   the grooved section of the rotating shaft splits off along the plurality of grooves and buckles, when the compression load reaches the preset load.

4. The moving body in accordance with claim 1, wherein the opposed member of the mounting structure is recessed in a direction away from the rotating shaft.

5. The moving body in accordance with claim 1, wherein the mounting structure includes a reinforcement member that is extended from the opposed member along the axial center in a direction away from the rotating shaft beyond the fuel cell unit mounted on the mounting structure.

6. A moving body, comprising:
   a fuel cell unit having at least one of a fuel cell configured to generate electric power through electrochemical reaction and a power circuit configured to generate an intended power from the electric power generated by the fuel cell;
   a radiator configured to release heat from a cooling medium used for cooling down the fuel cell unit;
   a radiator fan having a fin configured to rotate and thereby produce airflow and a rotating shaft configured to transmit a rotational force to the fin, the radiator fan being provided to blow the air to the radiator; and
   a mounting structure configured to mount the fuel cell unit on an axially extension of the rotating shaft of the radiator fan,
   wherein the mounting structure includes an opposed member that has an opposing face to an end of the rotating shaft and is located on the axially extension of the rotating shaft between the fuel cell unit mounted on the mounting structure and the radiator fan, and
   the rotating shaft of the radiator fan is released in a direction away from the fuel cell unit by a preset load, which is smaller than a specific load of deforming the mounting structure to such a degree that brings the opposed member into contact with the fuel cell unit mounted on the mounting structure.

* * * * *